(12) United States Patent
Ayers

(10) Patent No.: US 6,393,524 B1
(45) Date of Patent: May 21, 2002

(54) METHOD AND DRIVER FOR SEQUENTIAL OPERATION CACHING

(75) Inventor: Michael John Ayers, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/553,215

(22) Filed: Apr. 20, 2000

(51) Int. Cl.[7] .............................................. G06F 12/00
(52) U.S. Cl. ........................ 711/133; 711/170; 711/135
(58) Field of Search ................................ 711/118, 133, 711/151, 158, 135, 134, 170, 129

(56) References Cited

U.S. PATENT DOCUMENTS

| 5,381,528 A | * | 1/1995 | Brunelle | 710/56 |
| 5,937,426 A | * | 8/1999 | Sokolov | 711/113 |
| 5,954,801 A | * | 9/1999 | Sokolov | 710/5 |
| 6,092,149 A | * | 7/2000 | Hicken et al. | 711/112 |
| 6,279,077 B1 | * | 8/2001 | Nasserbakkht et al. | 710/52 |

* cited by examiner

*Primary Examiner*—Hong C Kim
(74) *Attorney, Agent, or Firm*—Joan Pennington

(57) ABSTRACT

In brief, methods, driver and computer program product are provided for sequential operation caching. When a data request from a requesting program is received, then checking for an empty cache is performed. Responsive to an empty cache, the requested data from a storage device is read into the cache. Then the requested data is read from the cache into the requesting program. Responsive to the cache not being empty, checking for the requested data in the cache is performed. Responsive to identifying the requested data in the cache, checking whether the data request is sequential from a last data request is performed. Responsive to the data request being sequential from a last data request, checking for a full cache is performed. Responsive to the cache not being full, the requested data and additional data are read from the storage device into the cache and the additional data is appended to current cache data. Then the requested data is read from the cache into the requesting program. Responsive to a full cache, the requested data is read from the cache into the requesting program. Once the cache is full, no further requests are sent to the storage device until all of the data in the cache has been used. Then the cache is emptied and the sequence is repeated.

19 Claims, 5 Drawing Sheets

FIG. 4
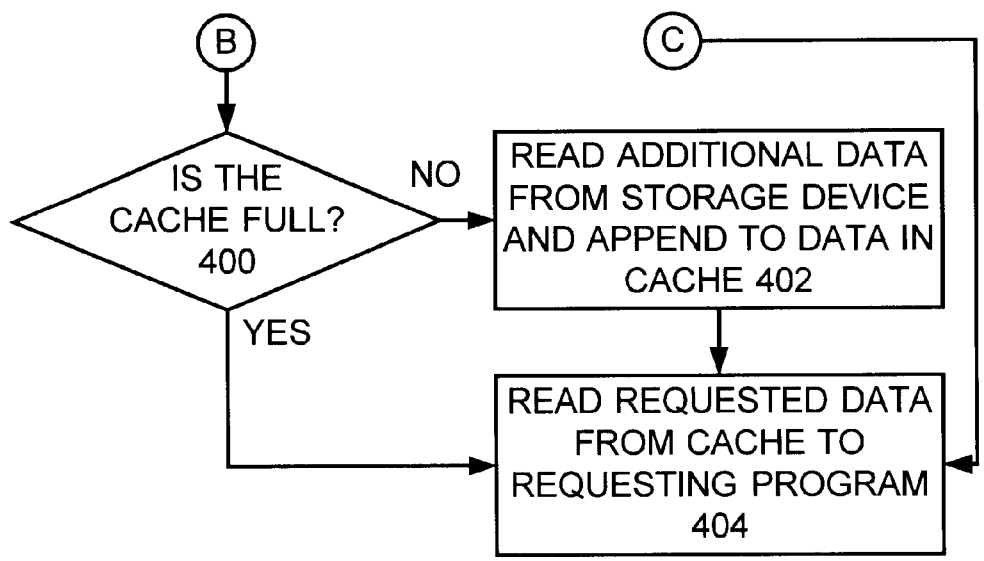
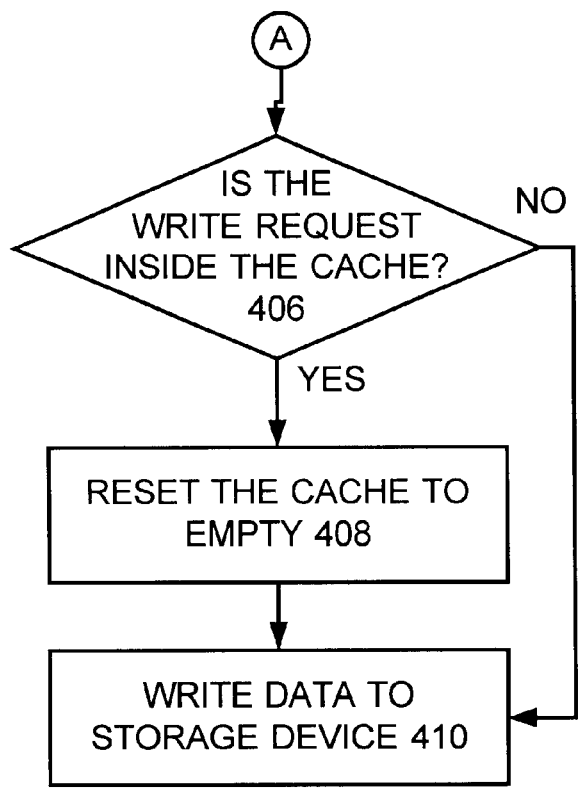

METHOD AND DRIVER FOR SEQUENTIAL OPERATION CACHING

FIELD OF THE INVENTION

The present invention relates generally to the data processing field, and more particularly, relates to a method, driver and computer program product for sequential operation caching.

DESCRIPTION OF THE RELATED ART

Many categories of handheld communications, entertainment and mobile computing devices are known. Many of these devices include a large capacity drive. Often these devices are battery powered during operation.

Problems with such known devices are high power consumption and correspondingly short battery life. For example, operation of an atadisk.dll driver provided with the Microsoft® Windows® CE operating system results in short battery life. The problem with the base driver is that when streaming data from the associated drive, such as while playing MP3 compression format music, the drive remains on during the entire playtime. This causes the batteries of the Windows CE device to run out quickly. The purpose of using a large capacity drive is defeated. There is little point in being able to store several hours of music on a drive if the batteries only last 30 minutes.

A need exists for a mechanism that enables improved power consumption requirements and correspondingly improved battery life for handheld communications, entertainment and mobile computing devices.

SUMMARY OF THE INVENTION

A principal object of the present invention is to provide a method, driver and computer program product for sequential operation caching. Other important objects of the present invention are to provide such methods, driver and computer program product for sequential operation caching substantially without negative effect; and that overcome many of the disadvantages of prior art arrangements.

In brief, methods, driver and computer program product are provided for sequential operation caching. When a data request from a requesting program is received, then checking for an empty cache is performed. Responsive to an empty cache, the requested data from a storage device is read into the cache. Then the requested data is read from the cache into the requesting program. Responsive to the cache not being empty, checking for the requested data in the cache is performed. Responsive to identifying the requested data in the cache, checking whether the data request is sequential from a last data request is performed. Responsive to the data request being sequential from a last data request, checking for a full cache is performed. Responsive to the cache not being full, the requested data and additional data are read from the storage device into the cache and the additional data is appended to current cache data. Then the requested data is read from the cache into the requesting program. Responsive to a full cache, the requested data is read from the cache into the requesting program.

In accordance with features of the invention, once the cache is full, no further requests are sent to the storage device until all of the data in the cache has been used. Then the cache is emptied and the sequence is repeated.

BRIEF DESCRIPTION OF THE DRAWINGS

The present invention together with the above and other objects and advantages may best be understood from the following detailed description of the preferred embodiments of the invention illustrated in the drawings, wherein:

FIGS. 3 and 4 are flow charts illustrating exemplary sequential steps for sequential operation caching in accordance with the preferred embodiment.

DETAILED DESCRIPTION OF THE PREFERRED EMBODIMENTS

Figure 1:
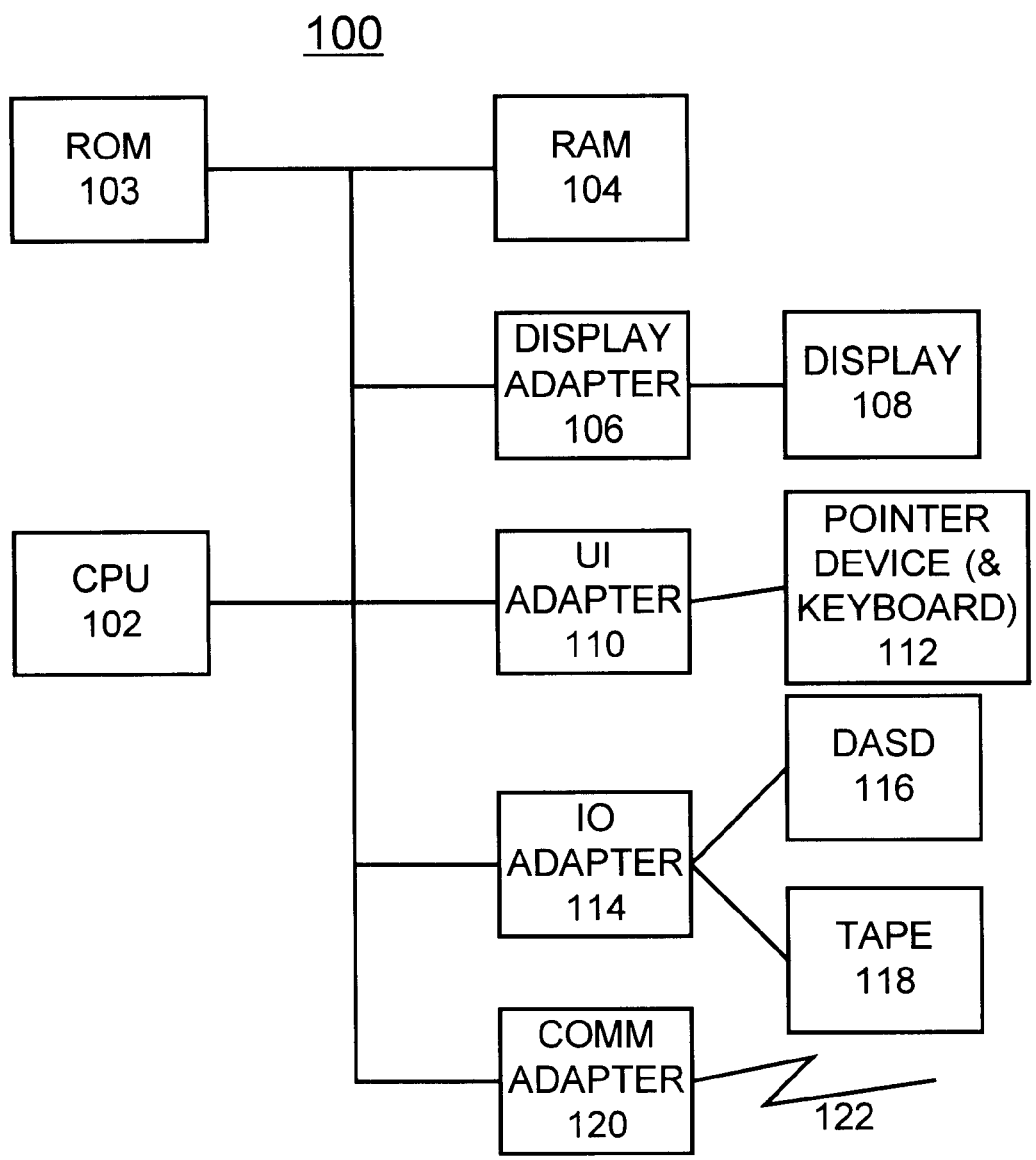
FIG. 1 is a block diagram representation illustrating a mobile computer system for implementing methods for sequential operation caching in accordance with the preferred embodiment.

Having reference now to the drawings, in FIG. 1, there is shown a computer or data processing system of the preferred embodiment generally designated by the reference character 100. As shown in FIG. 1, computer system 100 includes a central processor unit (CPU) 102, a read only memory 103, a random access memory 104, and a display adapter 106 coupled to a display 108. CPU 102 is connected to a user interface (UI) adapter 110 connected to a pointer device and keyboard 112. CPU 102 is connected to an input/output (10) adapter 114, for example, connected to a direct access storage device (DASD) 116 and a tape unit 118. CPU 102 is connected to a communications adapter 120 providing a communications network connection function with a network 122.

Figure 2:
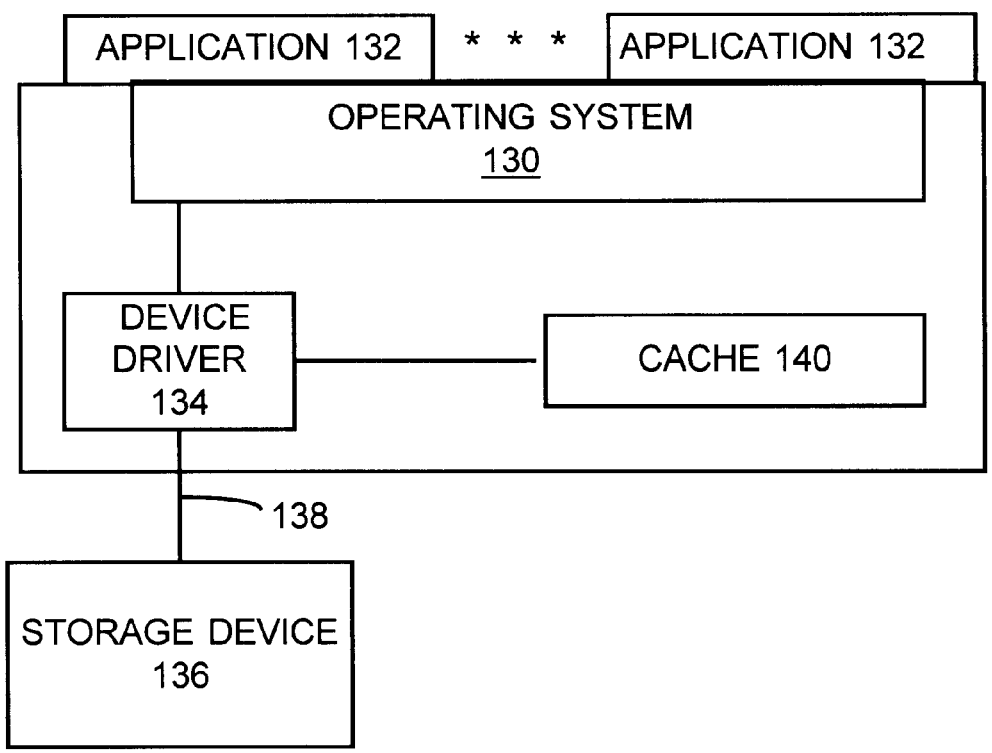
FIG. 2 is a block diagram representation illustrating an operating system of computer system of FIG. 1 for implementing methods for sequential operation caching in accordance with the preferred embodiment.

Referring to FIG. 2, there is shown a main system memory of the preferred embodiment generally designated by the reference character 128. As shown in FIG. 2, the computer system 100 includes an operating system 30 supporting multiple applications 132. A device driver 134 of the preferred embodiment supported by the operating system 130 is coupled to a storage device 136 via a bus 138, such as an ATA bus, a PCMCIA slot or a CompactFlash slot. In accordance with features of the preferred embodiment, device driver 134 includes a read cache 140 implemented in the system memory 128. A typical size of the read cache 140 is 1 MB. The size of the read cache 140 can be changed in the driver code of device driver 134.

Figure 3:
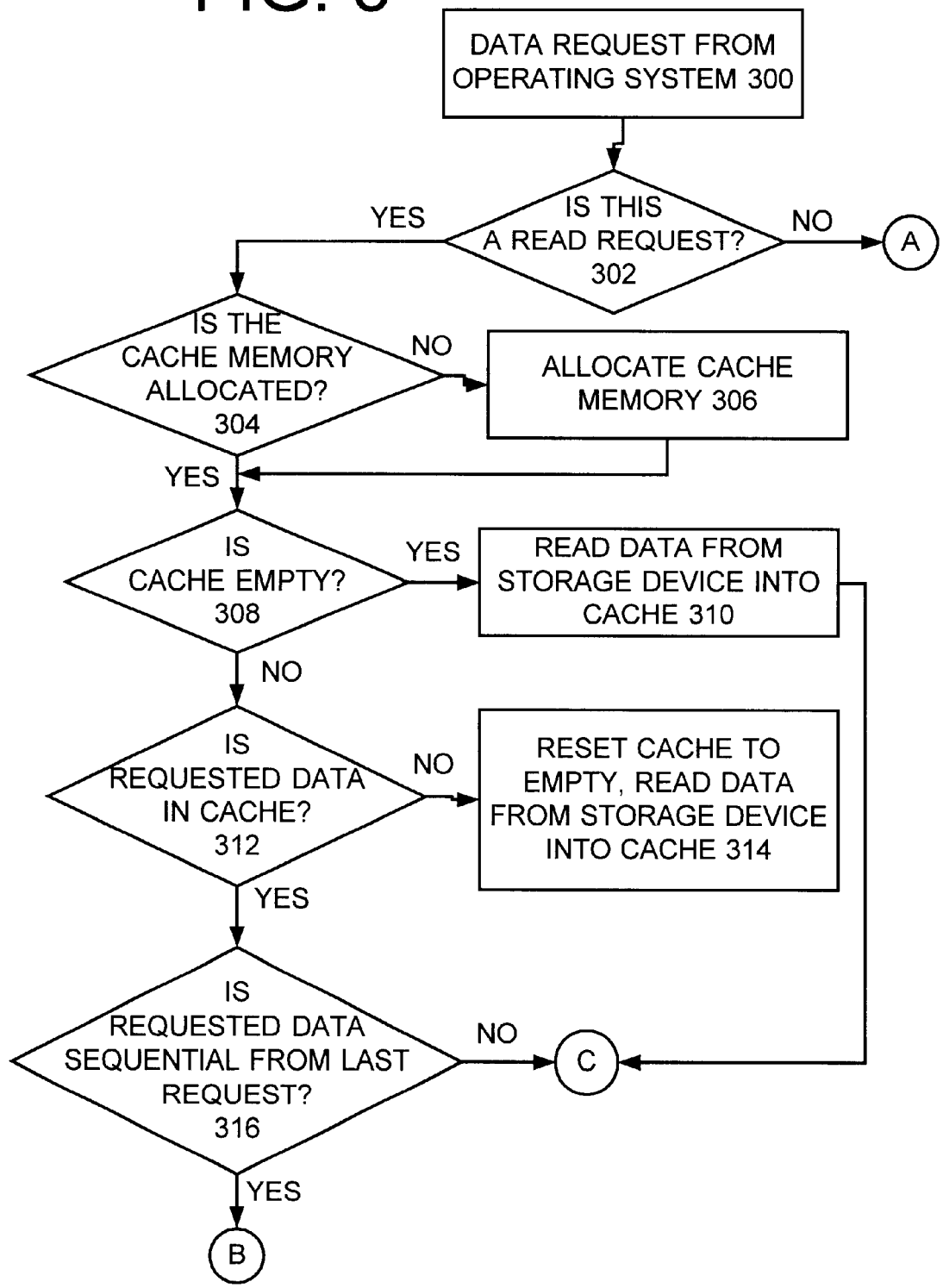

Central processor unit 102 is suitably programmed to execute the flow charts of FIGS. 3 and 4 of the preferred embodiment. Computer 100 may be implemented using any suitable computer, such as a mobile, handheld computer running the Windows CE operating system.

In accordance with features of the preferred embodiment, device driver 134 includes code to intercept a data request from any application 132 and satisfy the data request from read cache 140, reading from the storage device 136 to fill the cache if necessary. An advantage of the device driver 134 is the way the read cache 140 is filled. The first request to an empty cache 140 simply reads the requested data into the cache 140 and then copies the requested data to the application program 132. The next request reads the requested data plus another 16 sectors into the cache buffer 140. The driver then keeps track of the last sector requested. If the next request is sequential from the last and in the cache 140 then the driver 134 satisfies the request from the cache and appends more data from the storage device 136, such as the requested amount and 64 sectors, to the cache buffer 140.

This continues until the cache 140 is full. Once the cache 140 is full, no further requests are sent to the storage drive 136 until all of the data in the cache 140 is used. Then the cache buffer 140 is emptied and the procedure starts over. If any data is written to the storage drive 136 inside the area that the cache 140 currently contains, the cache 140 is emptied and returned to the initial state. Using the method for sequential operation caching of the preferred embodiment, when playing MP3 files at a 64 data rate, the storage drive 136 only has to run 5 seconds out of every 90 seconds of music. This substantially increases battery life as compared to a device where the storage drive remains on during the entire playtime.

Referring now to FIGS. 3 and 4, exemplary sequential steps are shown for sequential operation caching in accordance with the preferred embodiment. The method starts when a data request is received for the operating system as indicated in a block 300. Checking whether this is a read request is performed as indicated in a decision block 302. If not a read request, then sequential operations continue following entry point A in FIG. 4. When a read request is identified, then checking whether the cache memory is allocated is performed as indicated in a decision block 304. When the cache memory is not allocated, then the cache memory is allocated as indicated in a block 306. When the cache memory is allocated, then checking whether the cache memory is empty is performed as indicated in a decision block 308. When the cache memory is empty, the data from the storage device is read into the cache as indicated in a block 310. Then sequential operations continue following entry point C in FIG. 4. When the cache memory is not empty, then checking whether the requested data is in the cache is performed as indicated in a decision block 312. When whether the requested data is not in the cache, then the cache is reset to empty and the requested data is read from the storage device into the cache as indicated in a block 314. Then sequential operations continue following entry point C in FIG. 4. When whether the requested data is in the cache, then checking whether the requested data is sequential from the last request is performed as indicated in a decision block 316. When the requested data is sequential from the last request then sequential operations continue following entry point B in FIG. 4. When the requested data is not sequential from the last request then sequential operations continue following entry point C in FIG. 4.

Referring now to FIG. 4 following entry point B, checking whether the cache is full is performed as indicated in a decision block 400. When the cache is not full, then additional data is read from the storage device and appended to data in the cache as indicated in a block 402. When the cache is full and following entry point C, then the requested data is read from the cache to the requesting program as indicated in a block 404.

Referring now to FIG. 4 following entry point A, checking whether the write request is inside the cache is performed as indicated in a decision block 406. When the write request is inside the cache, the cache is reset to empty as indicated in a block 408. Then the data is written to the storage device as indicated in a block 410. Otherwise when the write request is not inside the cache, the data is written immediately to the storage device at block 410.

Figure 5:
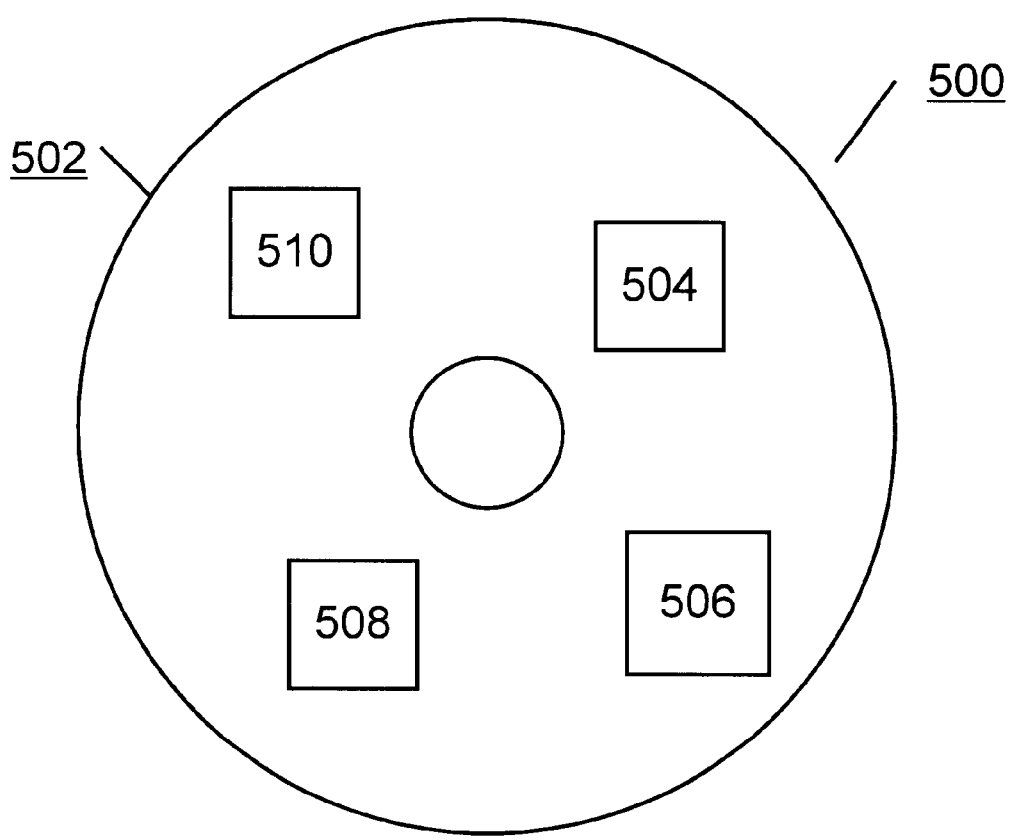
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods for sequential operation caching of the preferred embodiment in the system 100 of FIG. 1.

A sequence of program instructions or a logical assembly of one or more interrelated modules defined by the recorded program means 504, 506, 508, 510, direct the computer system 100 for sequential operation caching of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for sequential operation caching comprising the steps of:

receiving a data request from a requesting program;

checking for an empty cache;

responsive to identifying an empty cache, reading requested data from a storage device into the cache and reading requested data from the cache into the requesting program;

responsive to the cache not being empty, checking for the requested data in the cache, responsive to identifying the requested data in the cache, checking whether said data request is sequential from a last data request;

responsive to said data request being sequential from a last data request, checking for a full cache;

responsive to said cache not being full, reading requested data and additional data from said storage device into the cache and appending said additional data to current cache data and reading requested data from the cache into the requesting program; and responsive to identifying a full cache, reading requested data from the cache into the requesting program.

2. A computer-implemented method for sequential operation caching as recited in claim 1 further includes the steps responsive to identifying said full cache, of continuing with reading requested data from the cache into the requesting program until all the cache data is read.

3. A computer-implemented method for sequential operation caching as recited in claim 1 further includes the steps of responsive to not identifying the requested data in the cache, resetting the cache to empty; reading requested data from the storage device into the cache; and reading requested data from the cache into the requesting program.

4. A computer-implemented method for sequential operation caching as recited in claim 1 further includes the steps of responsive to receiving said data request from said requesting program, checking for cache memory allocation, and allocating said cache memory responsive to said cache memory not being allocated.

5. A computer-implemented method for sequential operation caching as recited in claim 1 further includes the steps of receiving a write request; and checking if the write request is inside the cache.

6. A computer-implemented method for sequential operation caching as recited in claim 5 further includes the steps responsive to said write request being inside the cache, of resetting the cache to empty and writing data to the storage device.

7. A computer-implemented method for sequential operation caching as recited in claim 5 further includes the steps of responsive to said identified write request not being inside the cache, of writing data to the storage device.

8. A device driver for sequential operation caching comprising:

means for receiving a data request from a requesting program;

means for checking for the requested data in the cache;

means responsive to identifying the requested data in the cache, for checking whether said data request is sequential from a last data request;

means responsive to said data request being sequential from a last data request, for checking for a full cache;

means responsive to said cache not being full, for reading requested data and additional data from said storage device into the cache and for appending said additional data to current cache data and for reading requested data from the cache into the requesting program; and means responsive to a full cache, for reading requested data from the cache into the requesting program.

9. A device driver for sequential operation caching as recited in claim 8 further includes means; responsive to receiving said data request, for checking for an empty cache;

means responsive to identifying an empty cache, for reading requested data from a storage device into the cache and for reading requested data from the cache into the requesting program; and said means for checking for the requested data in the cache being responsive to the cache not being empty.

10. A device driver for sequential operation caching as recited in claim 8 further includes means responsive to not identifying the requested data in the cache, for resetting the cache to empty; for reading requested data from said storage device into the cache and for reading requested data from the cache into the requesting program.

11. A device driver for sequential operation caching as recited in claim 8 further includes means responsive to a write request, for checking for the write request being inside the cache.

12. A device driver for sequential operation caching as recited in claim 11 further includes means responsive to said write request being inside the cache, for resetting the cache to empty and for writing data to the storage device.

13. A device driver for sequential operation caching as recited in claim 11 further includes means responsive to said write request not being inside the cache, for writing data to the storage device.

14. A computer program product for sequential operation caching, said computer program product including a plurality of computer executable instructions stored on a computer readable medium, wherein said instructions, when executed by a device driver in a computer system, cause the device driver to perform the steps of:

receiving a data request from a requesting program;

checking for the requested data in the cache, responsive to identifying the requested data in the cache, checking whether said data request is sequential from a last data request;

responsive to said data request being sequential from a last data request, checking for a full cache;

responsive to said cache not being full, reading requested data and additional data from said storage device into the cache and appending said additional data to current cache data and reading requested data from the cache into the requesting program; and responsive to identifying a full cache, reading requested data from the cache into the requesting program.

15. A computer program product for sequential operation caching as recited in claim 14 further includes the steps of:

checking for an empty cache;

responsive to identifying an empty cache, reading requested data from a storage device into the cache and reading requested data from the cache into the requesting program; and said step of checking for the requested data in the cache being responsive to the cache not being empty.

16. A computer program product for sequential operation caching as recited in claim 14 further includes the steps of: identifying a write request, and checking for the write request being inside the cache.

17. A computer program product for sequential operation caching as recited in claim 16 further includes the steps of: responsive to said write request being inside the cache, resetting the cache to empty and writing data to the storage device.

18. A computer program product for sequential operation caching as recited in claim 16 further includes the steps of: responsive to said write request not being inside the cache, writing data to the storage device.

19. A computer program product for sequential operation caching as recited in claim 14 further includes the steps of: responsive to not identifying the requested data in the cache, resetting the cache to empty; reading requested data from a storage device into the cache and reading requested data from the cache into the requesting program.

* * * * *